H. W. FELLOWS.
FEEDER FOR THRESHING MACHINES.
APPLICATION FILED MAY 25, 1914.
1,256,120.
Patented Feb. 12, 1918.
2 SHEETS—SHEET 1.
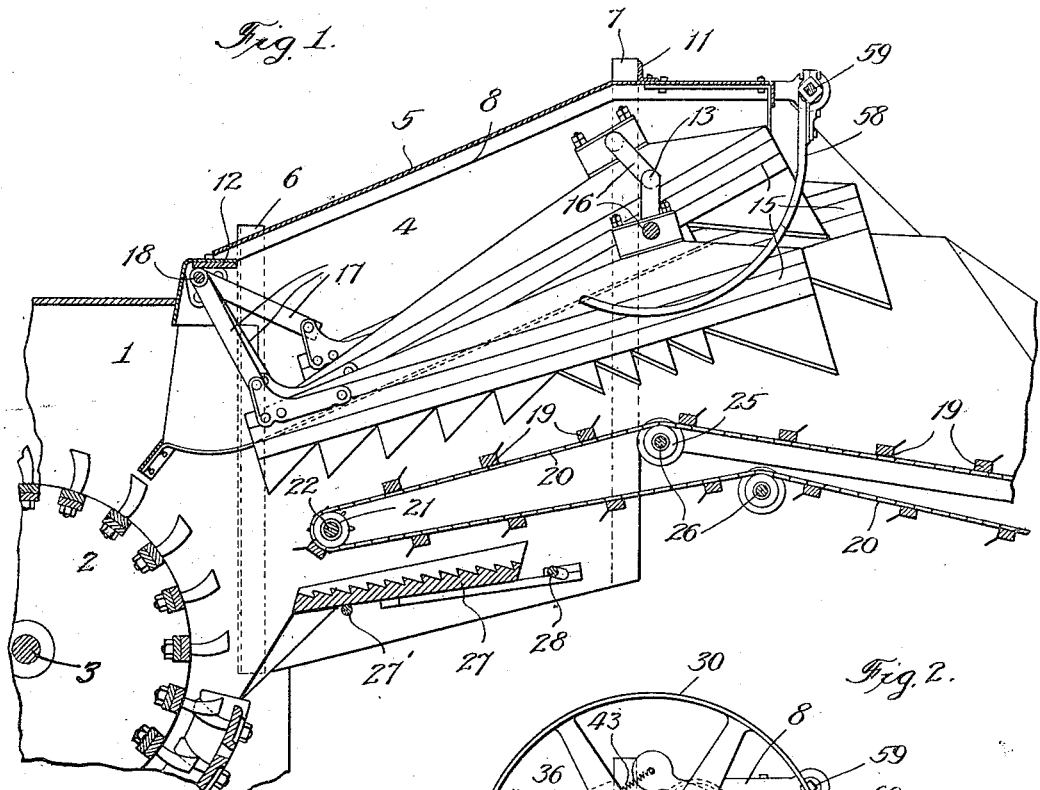

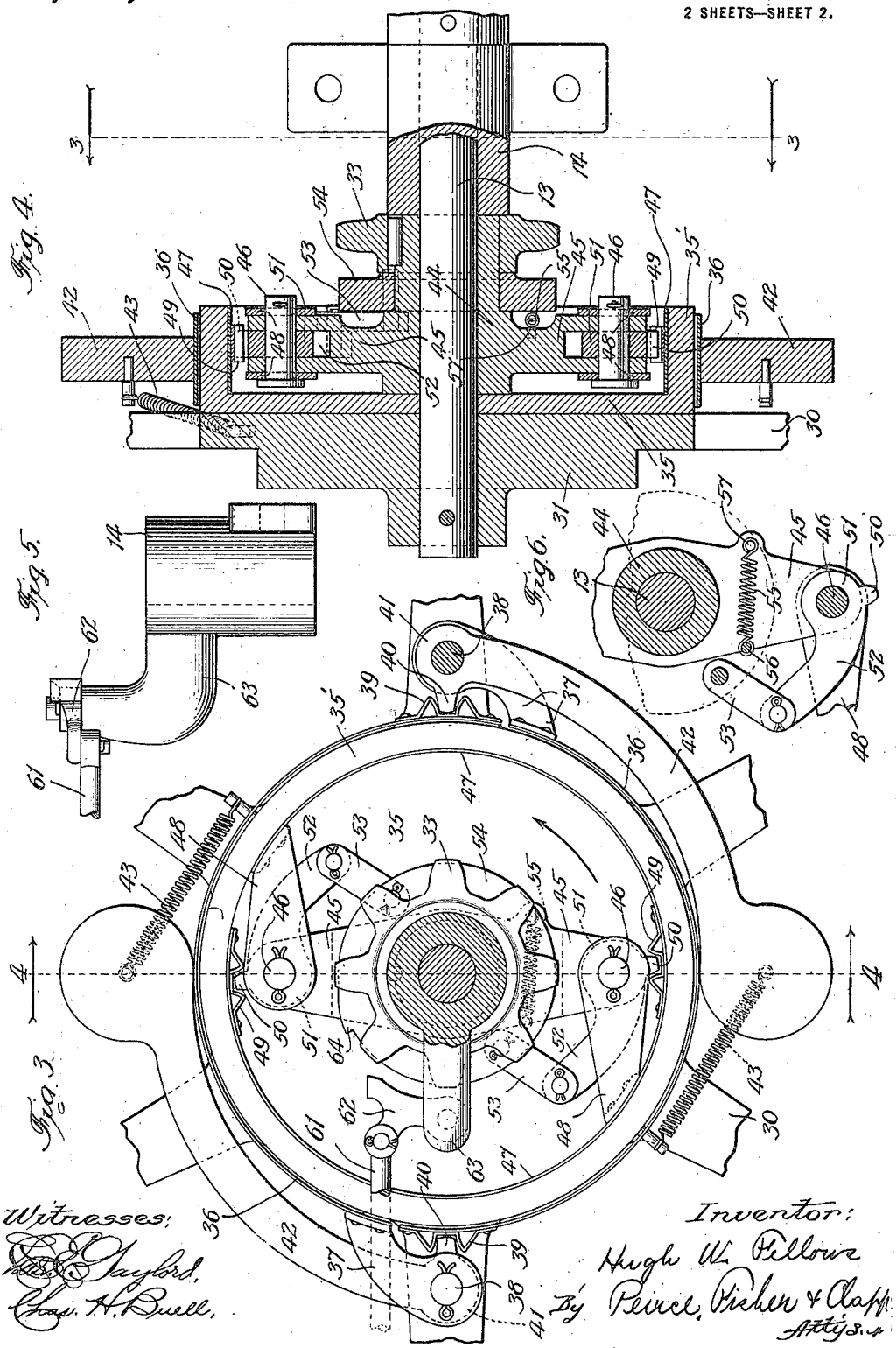

UNITED STATES PATENT OFFICE.

HUGH W. FELLOWS, OF LOS ANGELES, CALIFORNIA, ASSIGNOR TO J. I. CASE THRESHING MACHINE COMPANY, OF RACINE, WISCONSIN, A CORPORATION.

FEEDER FOR THRESHING-MACHINES.

1,256,120.      Specification of Letters Patent.      Patented Feb. 12, 1918.

Application filed May 25, 1914. Serial No. 840,917.

*To all whom it may concern:*

Be it known that I, HUGH W. FELLOWS, a citizen of the United States, and a resident of Los Angeles, county of Los Angeles, and State of California, have invented certain new and useful Improvements in Feeders for Threshing-Machines, of which the following is a full, clear, and exact description.

The invention relates to band-cutters and feeders for threshing machines and seeks to provide simple and effective means for driving the conveyer which delivers the straw to the threshing machine and which means is controlled both by a speed governor and a straw governor. The invention consists in the features of improvement hereinafter set forth, illustrated in the preferred form in the accompanying drawings and more particularly pointed out in the appended claims.

Figure 1 is a view in longitudinal section of the delivery end of a band-cutter and feeder to which the present invention is applied. Fig. 2 is a view in elevation illustrating the improved drive mechanism. Fig. 3 is an enlarged detail view in elevation of the speed and straw controlled clutch mechanisms mounted on the main drive shaft, parts being shown in section on the line 3—3 of Fig. 4. Fig. 4 is a detail section on the line 4—4 of Fig. 3. Fig. 5 is a detail plan view of the journal bracket for the main drive shaft. Fig. 6 is a detail view of parts shown in Figs. 3 and 4.

In Figs. 1 and 2, the front portion 1 of the threshing machine is shown and, in Fig. 1, a part of the threshing cylinder 2 is illustrated, the threshing cylinder being mounted, as usual, upon the main shaft 3 of the machine. The band-cutter and feeder is provided, as usual, with side walls 4 and its inner end is provided with a top wall or deck 5. The frame work of the inner end of the feeder comprises front and rear side bars 6 and 7 connected by upper and lower side bars 8 and 9 and by inclined brace bars 10. The opposite side bars are also connected at their upper ends by transverse bars 11 and 12.

The main shaft 13 of the feeder is journaled at the upper portion thereof on a pair of brackets 14 which are secured to the upper ends of the upright angle bars 7. This shaft operates a series of band-cutting knives which are preferably in the form of toothed bars 15 hung at their forward ends upon crank portions 16 of the shaft 13. The cutter bars are inclined downwardly and rearwardly and are connected at their rear ends to a series of swinging links 17 that depend from a transverse supporting rod 18. The endless straw conveyer comprises, as usual, cross slats 19 connected at their ends to chains 20. At its rear end, the chains 20 of the conveyer pass over sprocket wheels 21 which are fixed to a transverse drive shaft 22. This shaft is journaled at its ends in suitable brackets 23 at the lower rear portion of the feeder and at one end is provided with a drive sprocket wheel 24 (see Fig. 2). The straw conveyer extends upwardly and forwardly from the drive shaft 22 and passes over guide rollers 25 which are mounted upon cross shafts 26 beneath the front ends of the band-cutting knives 15. Thence, the straw conveyer passes downwardly and forwardly to the front end of the feeder. A notched bottom or feed board 27 is arranged beneath the delivery end of the straw conveyer upon a transverse guide rod 27' and is connected at its forward end to crank portions of a transverse shaft 28 which is provided on one end with a sprocket wheel 29.

The main shaft 13 of the feeder is provided with a pulley 30 which is belted, as usual, to the main shaft 3 of the threshing machine. This pulley, as shown, is provided with an enlarged hub 31 (see Figs. 2 and 4) which is preferably fixed to the shaft 13 as shown, so that the band-cutting knives are driven at all times when the machine is in operation. The straw conveyer and the notched bottom or feed board 27 are driven from the main shaft through the medium of a chain 32 which passes over a sprocket wheel 33 on the main shaft, thence downwardly on opposite sides thereof and over the sprocket wheels 24 and 29 which are fixed, respectively, to the shafts 22 and 28. Thence, the chain 32 passes upwardly over an idler sprocket wheel 34 which is suitably mounted upon the side of the feeder above the driving sprocket wheel 33. The driving sprocket wheel 33 is loosely mounted on the main drive shaft 13 and an intermediate member is interposed between the sprocket wheel and the pulley 30. The intermediate or driving member for the sprocket wheel member is connected to the pulley by a speed controlled clutch mechanism and to the sprocket 33 through the medium of a clutch mechanism controlled by a suitable straw governor.

In the preferred construction shown, the intermediate member comprises a clutch disk 35 which is loosely mounted on the shaft 13 adjacent the enlarged hub 31 of the drive pulley and the clutch disk is provided with an inwardly projecting friction rim 35'. Two semi-circular clutch bands or shoes 36 are arranged to engage the outer face of the friction rim 35'. Each of these shoes is fixed at one end to a pair of arms 37 that engage a pivot stud 38 upon one of the spokes of the pulley. The opposite or free end of each shoe or clutch band is provided with a notched or recessed lug 39 which is arranged to be engaged by a short offset arm 40 on a hub 41 mounted upon the opposite stud 38. Each hub 41 is provided with a curved, weighted arm 42, the free end of which is connected to the hub 31 of the pulley by a spring 43. When the machine reaches threshing speed, the weighted arms 42 are thrown outwardly by centrifugal force and the clutch bands or shoes 36, through the medium of the connections described, are snugly engaged with the friction rim 35' of the clutch member 35 to thereby connect the latter to the drive pulley and to the main shaft 13.

A clutch member is interposed between the clutch disk 35 and the driving sprocket 33 and comprises a hub 44 which is loosely mounted upon the shaft between the clutch disk 35 and the journal bracket 14. The driving sprocket wheel 33 (see Fig. 4) is keyed to the inner end of the hub 44. At its inner end, the hub 44 is provided with diametrically projecting arms 45 which are bifurcated at their outer ends and provided with pivot studs 46. Curved clutch bands or shoes 47 are arranged to engage the inner face of the friction rim 35'. Each of these shoes is fixed at one end to a pair of arms 48 which engage one of the pivot studs 46. The opposite end of each clutch band is provided with a notched lug 49 which is engaged by an offset lug 50 on a hub 51. The hubs 51 are mounted upon the pivot studs 46 between the pairs of bifurcated arms 45. Each hub is provided with a projecting integral arm 52 which is connected by a link 53 to an annular clutch shifter 54 which is loosely mounted upon the hub 44 of the clutch member. A coil spring 55 is connected at its ends to pins 56 and 57 which are fixed, respectively, to the clutch shifter 54 and to one of the arms 45 of the clutch member. This spring tends to rotate the clutch shifter in the direction indicated by the arrow in Fig. 3 so that the clutch shoes 47 are normally held in engagement with the internal surface of the friction rim 35'.

The shoes 47 are adapted to be disengaged through the medium of a straw governor which, in the preferred form shown, comprises a series of arms 58 (see Fig. 1) which are mounted upon a transverse rock-shaft 59 and extend downwardly and rearwardly between the band-cutting knives. This rock shaft is journaled in suitable bearings in the forwardly projecting portions of the frame bars 8 and is provided at one end (see Fig. 2) with a depending crank arm 60. This arm 60 is connected by a rearwardly extending link 61 to a dog 62 (see Figs. 3 and 5) which is pivotally mounted upon a part 63 that projects from the fixed bearing bracket 14. This dog is arranged to coöperate with a lug 64 formed on the periphery of the clutch shifter 54. Normally, the dog 62 stands out of the path of movement of the lug 64 but when straw accumulates or is bunched in large quantities beneath the governor arms 58, the dog 62 is shifted inwardly so that it engages the lug 64 and thereby holds the latter against movement. When the clutch shifter is thereby held against movement, the arms 52 will be rocked by the links 53 to thereby disengage the clutch shoes 47 and the straw conveyer which is driven by the sprocket 33 will be held against movement.

In the idle position of the parts, the speed-controlled clutch mechanism between the friction rim and the pulley 30 is normally disengaged, while the clutch mechanism controlling the straw governor between the friction rim 35' and the sprocket wheel 33 is spring-held in engaged position. In operation, the friction shoes or bands 36 will be engaged by the outward movement of the weighted arms 42 when the machine reaches threshing speed to thereby throw the straw conveyer into operation. If, at any time, the machine is driven below threshing speed, the shoes 36 are disengaged and the straw conveyer is thrown out of operation. As already stated, the straw governor arms 58, when straw is bunched beneath them, will shift the dog 62 inwardly so that the latter then coöperates with the clutch shifter 54 to disengage the clutch shoes 47 and thereby check the forward movement of the conveyer until the amount of straw beneath the band-cutting knives is reduced.

By mounting both clutch mechanisms on the same shaft, and preferably upon the main drive shaft, the number of parts is greatly reduced. Furthermore, friction clutch mechanisms are provided which will automatically yield in case any great strain is suddenly thrown upon the parts, so that the danger of breaking or injuring the parts is obviated.

It is obvious that numerous changes may be made in the details set forth without departure from the essentials of the invention as defined in the claims.

I claim as my invention:—

1. In a feeder for threshing machines, the combination with band-cutting knives, a conveyer, a main drive shaft and a driving pulley thereon, of a gear loosely mounted on said shaft and connected to said conveyer, an intermediate drive member on said shaft for said gear, centrifugally operated clutch devices for connecting said intermediate member to said pulley, supplemental clutch devices for connecting said intermediate drive member and said gear, and a straw governor for throwing the supplemental clutch devices out of operation, substantially as described.

2. In a feeder for threshing machines, the combination with band-cutting knives, a conveyer and a main drive shaft, of a gear and a driving member therefor both loosely mounted on said shaft, driving connection between said gear and said conveyer, centrifugally operated clutch devices for connecting said driving member to said shaft, supplemental clutch devices for connecting said member to said gear, and a straw governor controlling said supplemental clutch devices, substantially as described.

3. In a feeder for threshing machines, the combination with the band-cutting knives, a main drive shaft therefor, and a pulley on said shaft, of a conveyer, a gear loose on said main drive shaft and connected to said conveyer, a clutch member on said shaft interposed between said pulley and said gear, main and supplemental clutch devices for respectively connecting said member to said pulley and said gear, a speed governor mounted on said pulley and controlling said main clutch devices, and a straw governor mounted on the main frame and controlling said supplemental clutch devices, substantially as described.

4. In a feeder for threshing machines, the combination with the band-cutting knives, a main drive shaft therefor, and a pulley on said shaft, of a conveyer, a gear loose on said main drive shaft and connected to said conveyer, a friction clutch disk mounted on said shaft between said gear and said pulley, main and supplemental clutch shoes connected respectively to said pulley and said gear and arranged to engage said disk, centrifugal members controlling said main clutch shoes, and straw governing devices for releasing said supplemental clutch shoes, substantially as described.

5. In a feeder for threshing machines, the combination with the band cutting knives, a main drive shaft therefor, and a pulley on said shaft, of a conveyer, a gear loose on said main drive shaft and connected to said conveyer, a clutch member having a friction rim mounted on said shaft between said pulley and said gear, centrifugally controlling clutch shoes mounted on said pulley and arranged to engage the outer face of said friction rim, supplemental, spring-pressed clutch shoes connected to said gear and arranged to engage the internal face of said rim, and a straw governing device for releasing said supplemental clutch shoes, substantially as described.

6. In a feeder for threshing machines, the combination with the band-cutting knives, a main drive shaft therefor, and a conveyer, of a gear loosely mounted on said shaft and connected to said conveyer to drive the same, a clutch member loosely mounted on said shaft, main and supplemental clutch devices for respectively connecting said clutch member to said shaft and to said gear, a centrifugal speed governor on said shaft for controlling said main clutch devices, and a straw governor on the main frame for releasing said supplemental clutch devices, substantially as described.

7. In a feeder for threshing machines, the combination with the band-cutting knives, a main drive shaft therefor, and a conveyer, of a gear loosely mounted on said shaft and connected to said conveyer to drive the same, a friction disk loosely mounted on said shaft, centrifugally controlled clutch shoes mounted on said shaft and arranged to engage said disk, spring-pressed clutch shoes connected to said gear and arranged to engage said disk, a trip for said spring pressed shoes, and straw governing devices for shifting said trip, substantially as described.

8. In a feeder for threshing machines, the combination with band cutting knives, a main drive shaft therefor, and a conveyer, of a drive pulley keyed to said shaft, a gear loosely mounted on said shaft, a drive chain connecting said gear and said conveyer, a clutch disk having a friction rim interposed between said pulley and said gear, centrifugally controlled clutch shoes carried by said pulley and arranged to engage the outer face of said friction rim, supplemental clutch shoes connected to said gear and arranged to engage the internal face of said rim, and a straw governor controlling said supplemental clutch shoes, substantially as described.

9. In a feeder for threshing machines, the combination of a main drive shaft, band-cutting knives connected to said shaft, a conveyer, a gear loosely mounted on said shaft, a drive chain directly connecting said gear and said conveyer, a speed-controlled clutch mechanism mounted on said shaft, a second clutch mechanism interposed between said first clutch mechanism and said gear, and a straw governing device controlling said second clutch mechanism, substantially as described.

10. In a feeder for threshing machines, the combination with a conveyer and a main drive shaft, of a gear loose on said shaft and connected to said conveyer, a disk having a friction rim on said shaft, a clutch member fixed to said gear, clutch shoes connected to said member and arranged to engage said friction rim, a shifter for said shoes mounted on said clutch member, a dog arranged to engage and arrest said clutch shifter to thereby release said shoes, a rock shaft operatively connected to said dog, and a series of arms mounted on said shaft and arranged to rest on the straw on said conveyer.

HUGH W. FELLOWS.

Witnesses:
 GEO. F. FISHER,
 J. G. ANDERSON.

Copies of this patent may be obtained for five cents each, by addressing the "Commissioner of Patents, Washington, D. C."